United States Patent
Boyce (10) Patent No.: US 9,402,083 B2
(45) Date of Patent: Jul. 26, 2016

(54) SIGNALING CONFORMANCE POINTS USING PROFILE SPACE

(71) Applicant: Vidyo, Inc., Hackensack, NJ (US)

(72) Inventor: Jill Boyce, Manalapan, NJ (US)

(73) Assignee: Vidyo, Inc., Hackensack, NJ (US)

( * ) Notice: Subject to any disclaimer, the term of this patent is extended or adjusted under 35 U.S.C. 154(b) by 73 days.

(21) Appl. No.: 14/615,975

(22) Filed: Feb. 6, 2015

(65) Prior Publication Data

US 2015/0312584 A1  Oct. 29, 2015

Related U.S. Application Data

(60) Provisional application No. 61/983,907, filed on Apr. 24, 2014.

(51) Int. Cl.
*H04N 19/513*  (2014.01)
*H04N 19/44*  (2014.01)

(52) U.S. Cl.
CPC ............ *H04N 19/513* (2014.11); *H04N 19/44* (2014.11)

(58) Field of Classification Search
CPC ... H04N 19/0089; H04N 19/30; H04N 19/82; H04N 7/26; H04N 7/12; H04N 19/44; H04N 19/513
USPC ...................................... 375/240.12, 240.25
See application file for complete search history.

(56) References Cited

U.S. PATENT DOCUMENTS

| | | | |
|---|---|---|---|
| 2012/0229602 A1* | 9/2012 | Chen | H04N 19/597 348/43 |
| 2013/0230095 A1* | 9/2013 | Mathew et al. | 375/240.02 |
| 2013/0287123 A1* | 10/2013 | Rusert | G06F 17/30516 375/240.26 |
| 2014/0003489 A1* | 1/2014 | Hannuksela | 375/240.02 |
| 2014/0003493 A1* | 1/2014 | Chen | H04N 19/597 375/240.02 |
| 2014/0086319 A1* | 3/2014 | Xu et al. | 375/240.12 |
| 2014/0086333 A1* | 3/2014 | Wang | 375/240.25 |
| 2014/0092955 A1* | 4/2014 | Wang | H04N 19/70 375/240.02 |
| 2014/0098851 A1* | 4/2014 | Chen | H04N 19/70 375/240.02 |
| 2014/0192858 A1* | 7/2014 | Haque et al. | 375/240.02 |
| 2015/0023434 A1* | 1/2015 | Schierl | H04N 19/70 375/240.26 |
| 2015/0078456 A1* | 3/2015 | Hannuksela | 375/240.25 |
| 2015/0103888 A1* | 4/2015 | Chen | H04N 21/4343 375/240.02 |
| 2015/0195549 A1* | 7/2015 | Wang | H04N 19/70 375/240.12 |
| 2015/0312580 A1* | 10/2015 | Hannuksela | H04N 19/70 375/240.02 |

* cited by examiner

*Primary Examiner* — Jay Patel
*Assistant Examiner* — Francis G Geroleo
(74) *Attorney, Agent, or Firm* — Baker Botts, LLP (57) ABSTRACT

An unused value of the general_profile_space syntax element can be used to indicate that a layer with a non-zero value of nuh_layer_id in a multi-layer bitstream is otherwise conforming to a profile.

15 Claims, 5 Drawing Sheets

FIG. 1

| | Descriptor |
|---|---|
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

101 — nal_unit_header( ) {
102 — forbidden_zero_bit
103 — nal_unit_type
104 — nuh_layer_id
105 — nuh_temporal_id_plus1

FIG. 2

| | Descriptor |
|---|---|
| profile_tier_level( profilePresentFlag, maxNumSubLayersMinus1 ) { | |
|   if( profilePresentFlag ) { | |
|     general_profile_space | u(2) |
|     general_tier_flag | u(1) |
|     general_profile_idc | u(5) |
|     for( j = 0; j < 32; j++ ) | |
|       general_profile_compatibility_flag[ j ] | u(1) |
|     general_progressive_source_flag | u(1) |
|     general_interlaced_source_flag | u(1) |
|     general_non_packed_constraint_flag | u(1) |
|     general_frame_only_constraint_flag | u(1) |
|     [...] | |
| } | |

*profile_tier_level( ) syntax structure* general_profile_space specifies the context for the interpretation of general_profile_idc and general_profile_combatibility_flag[ i ] for all values of i in the range of 0 to 31, inclusive. The value of general_profile_space shall be in the range of 0 ... 1 equal to 0 in bitstreams conforming to this version of this Specification. Other values for general_profile_space are reserved for future use by ITU-T | ISO/IEC. Decoders shall ignore the CVS when general_profile_space is not in the range of 0 ... 1 equal to 0.

301 ⎯ For each layer j in the output layer set for which the profile_tier_level( ) syntax structure applies, when (NumDirectRefLayers[ j ] > 0 || poc_lsb_not_present_flag[ j ] == 1), the value of general_profile_space shall be equal to 0.

FIG. 4

The shaded sections indicate differences in the slice segment header syntax table which can be different for layers with nuh_layer_id > 0 vs. layers with nuh_layer_id equal to 0.

| slice_segment_header( ) { | Descriptor |
|---|---|
| [...] | |
| if( nuh_layer_id > 0 && !poc_lsb_not_present_flag[ LayerIdxInVPS[ nuh_layer_id ] ] \| \| | |
| nal_unit_type != IDR_W_RADL && nal_unit_type != IDR_N_LP ) { | |
| slice_pic_order_cnt_lsb | u(v) |
| [...] | |
| if( nuh_layer_id > 0 && !default_ref_layers_active_flag && | |
| NumDirectRefLayers[ nuh_layer_id ] > 0 ) { | |
| inter_layer_pred_enabled_flag | u(1) |
| if( inter_layer_pred_enabled_flag && NumDirectRefLayers[ nuh_layer_id ] > 1 ) { | |
| if( !max_one_active_ref_layer_flag ) | |
| num_inter_layer_ref_pics_minus1 | u(v) |
| if( NumActiveRefLayerPics != NumDirectRefLayers[ nuh_layer_id ] ) | |
| for( i = 0; i < NumActiveRefLayerPics; i++ ) | |
| inter_layer_pred_layer_idc[ i ] | u(v) |
| } | |
| } | |
| [...] | |
| } | |

SIGNALING CONFORMANCE POINTS USING PROFILE SPACE

PRIORITY AND RELATED APPLICATION

This application claims priority to U.S. Ser. No. 61/983,907, filed Apr. 24, 2014, entitled "Signaling Conformance Points using Profile Space." the disclosure of which is incorporated by reference in its entirety.

FIELD

The disclosed subject matter relates to video coding techniques, for example, a video bitstream conforming to H.265.

BACKGROUND

ITU-T Rec. H.265, entitled High Efficiency Video Coding, version 04/2013, (available from International Telecommunication Union (ITU), Place des Nations, 1211 Geneva 20, Switzerland, and incorporated herein by reference in its entirety), is referred herein as HEVC.

HEVC may be enhanced by a scalable extension known as SHVC (see JCT-VC-P1008, available from http://phenix.it-sudparis.eu/jct/doc_end_user/current_document.php?id=8839, incorporated herein in its entirety.) SHVC, in contrast to SVC, may support coding multiple spatial or SNR enhancement layers in addition to a base layer in one scalable bitstream. Other extensions to H.265 may cover, for example, the multiview case.

HEVC and its extensions distinguish between a Video Coding Layer (VCL) and a Network Abstraction Layer (NAL). The VCL refers to those mechanisms and tools described in HEVC and its extensions that cover the bitstream syntax and decoding process of slices and syntax elements included in slices. The NAL refers to those mechanisms and tools conceptually above the syntax elements of slices. The term "layer" as used above is meant to distinguish conceptual parts of the HEVC standard document, and is not to be confused with "layer" in layered coding tools. Henceforth, when the term "layer" is used outside of the use of the two terms Network Abstraction Layer and Video Coding Layer, it is meant to be the layer as identified by a layer_id.

The term VCL conformance is also used herein and is meant such that the VCL data structures of a bitstream or parts thereof (including, for example all slices of a coded video bitstream included in NAL units with a given zero or non-zero nuh_layer_id) conform to a given profile, for example the main profile, and/or tier and/or level. However, for VCL conformance, it is not required that the syntax elements syntactically above the slice layer (belonging to the Network Abstraction Layer; syntax elements like parameter sets, nal unit header, and similar) are conforming to the profile in question. For example, a single layer bitstream that would be main profile conformant but for the fact that the nuh_layer_id of all its NAL units is equal to 1 would be VCL conformant with the main profile, even if it is not fully conformant due to the fact that the nuh_layer_id is equal to 1, while the main profile requires the nuh_layer_id to be equal to zero.

The term VCL conformance can be considered practical, for example, because the majority of the computational complexity of a decoder can lie in the decoding of the VCL syntax elements. In practice, at least some hardware implementations implement large parts or the complete VCL decoding process in dedicated hardware, microcode, ROM, and similar "hard coded" techniques, whereas NAL based mechanisms are implemented in software on an embedded or external general purpose processor. At least for such architectures, it can be of interest to have VCL-conformant bitstreams (or parts of bitstreams, such as auxiliary output layer sets) clearly identified and VCL-conformance for them established.

Certain video coding standards such as SHVC and/or other extensions of HEVC may include a feature known as an "auxiliary picture". An auxiliary picture is a coded picture (or depending on context, a sequence of coded pictures, or a plurality of layers in an output layer set, where each layer includes a sequence of coded pictures) that may not be intended for display directly, but is rather intended as control information for the display process and other similar tasks. Example applications for auxiliary pictures include close captioning, overlay, alpha maps, and similar. Another application example for an auxiliary picture is the coding of a second representation of the same content, but potentially at a different resolution/fidelity/bitrate . . . in the same bitstream and potentially with the timing and prediction properties similar to the primary picture. In that case, the auxiliary picture may be intended for display, but in lieu of the primary coded picture or primary output layer set as described below. Whether or not such an auxiliary picture would be called such or called a simulcast picture is an issue of definition. When mentioning auxiliary pictures henceforth, simulcast pictures in the aforementioned sense are meant to be included.

The feature of an auxiliary picture was introduced into standardization, for example, in the form of alpha maps, in H.264/SVC.

As auxiliary pictures need to be decoded, a conformance point for the auxiliary picture(s) (for example in the form of profile/tier/level) may need to be established. Without such an established conformance point, a decoder may not know whether it can decode the picture, a system cannot decide whether to accept a bitstream containing the auxiliary picture(s) for decoding, and other unwanted consequences. The rationale here can be the same as for establishing conformance points for primary coded pictures, which are known in the art.

In the terminology of HEVC and its extensions, an auxiliary picture can be included in an output layer set. In SHVC, for example, a scalable bitstream can contain more than one output layer set. The output layer set containing a layer with the layer_id equal to zero is the output layer set that is primarily intended for display, and is referred to henceforth as primary output layer set. Output layer sets containing auxiliary pictures, which have layer_id not equal to zero, are referred to as auxiliary output layer set(s).

ITU-T document JCTVC-Q0078 addresses aspects of conformance signalling of auxiliary pictures. Several components were included as part of this document, including the following, as expressed in the High Level Syntax BoG Report JCTVC-Q0223:

JCTVC-Q0078: mechanism for signaling a profile/tier/level conformance point for auxiliary pictures, including the aspects listed below.
  signaling of additional layer sets
  description of how profile_tier_level applies
  define normative rewriting process
  VPS rewriting SEI message
  output layer set nesting SEI message The design outlined in JCTVC-Q0078 and its implementation can be highly complex. Further, it may not provide a mechanism to signal conformance of an output layer set containing multiple auxiliary picture layers within the same bitstream, which use inter-layer prediction. It also relies on the use of SEI messages that, in at least some implementations may be ignored by the decoder or removed in the transmission path, which may render any operation of auxiliary pictures unreliable).

SUMMARY

In an exemplary embodiment of the disclosed subject matter, an unused value of the general_profile_space syntax element or an unused other syntax element can be used to indicate that a layer with a non-zero value of nuh_layer_id in a multi-layer bitstream is otherwise Video-Coding_Layer (VCL)-conforming to at least one of a profile, tier, or level. This enables, for example, establishing the VCL-conformance of the lowest layer of an auxiliary output layer set with one or more HEVC version 1 profile(s), which, in turn, enables in at least some implementations the (potentially computationally expensive) decoding of the VCL syntax elements by an HEVC version 1 VCL-conforming decoder.

BRIEF DESCRIPTION OF THE DRAWINGS

Further features, the nature, and various advantages of the disclosed subject matter will be more apparent from the following detailed description and the accompanying drawings in which.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

Throughout the description of the disclosed subject matter, the following terms are used:

The term primary picture refers to a picture or sequence of pictures, coded in one or more layers (depending on context) using layered coding tools, normally intended for display. A primary output layer set contains a primary picture layer. A primary picture contains at least one NAL unit with a nuh_layer_id equal to zero.

Auxiliary picture refers to a picture that may not be intended for display but for auxiliary purposes, or a simulcast picture. An Auxiliary picture may be coded in a scalable layer in the sense that it has a layer_id that is distinct from the layers used for the primary picture; however, it is not used to represent the primary picture itself at a different resolution or SNR fidelity. In other words, NAL units belonging to an auxiliary picture are indicated by using a non-zero layer_id, even if they do not belong to an enhancement layer. Auxiliary pictures can be of different types. Multiple auxiliary pictures may be associated with the same primary picture. Auxiliary pictures may conform to complex profiles. For example, they may be scalably coded, using inter-layer prediction from other auxiliary picture layers of the same auxiliary picture type. However, they may also be VCL-conformant to version 1 profiles such as main profile. The disclosed subject matter is primarily concerned with this latter case.

The primary output layer set can include the primary coded picture and any enhancement layers associated with the primary coded picture, where there is an inter-layer prediction relationship (directly or indirectly) between the primary coded picture and each of the enhancement layers.

An auxiliary output layer set can include an auxiliary picture coded pictures and any enhancement layers referring to the auxiliary coded pictures, directly or indirectly.

Figure 1:
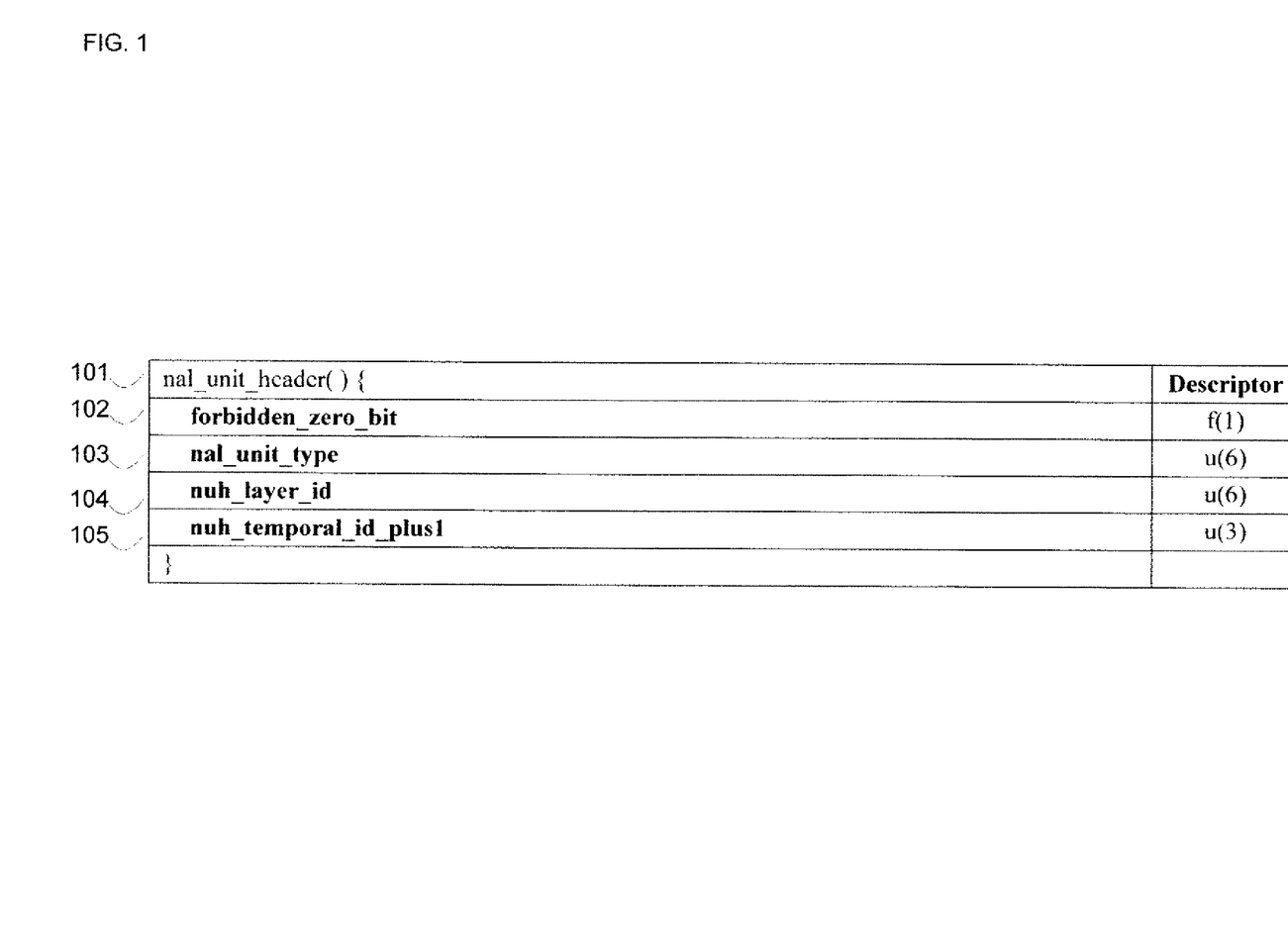
FIG. 1 shows a syntax diagram of a nal unit header in accordance with prior art.

An HEVC version 1 compliant decoder operates on NAL units with a header (101) as shown in FIG. 1 and described below.

The forbidden_zero_bit (102) must be zero for compatibility with certain system level specifications. The six bit NAL unit type (103) indicates the type of the NAL unit (such as: parameter set of a certain type, slice of certain picture types, SEI message, and so forth). As the HEVC version 1 profiles do not support scalability or multiview, a version 1 output layer set is the primary output layer set as described above and necessarily contains only a single layer with nuh_layer_id equal to zero. Nuh_temporal_id_plus1 indicates the temporal sublayer to which the NAL unit belongs to.

According to the SHVC extension, an auxiliary output layer set contains only auxiliary picture layers, and those (including the lowest layer of the auxiliary picture) are indicated by a nuh_layer_id other than zero, but may VCL-conform to profiles such as the main profile. In some cases, for example in the simulcast use case, it can be sensible to remove the NAL units of the primary picture (indicated by nuh_layer_id equal to 0) and "rewrite" the nuh_layer_id of an auxiliary picture from its non-zero value to 0, followed by feeding the nal unit into an otherwise essentially unmodified HEVC version 1 decoder. Such a rewriting process can be desirable, for example, because rewriting a six bit field in a fixed length codeword at a fixed location is computationally inexpensive. Complex, potentially hardware accelerated and highly optimized decoders do not need to be modified to accept auxiliary pictures for decoding after this change. For the above techniques, there are some additional operations required for full decoding, such as rewriting certain parts of parameter sets. However, such operation can be infrequent and computationally inexpensive, and can involve only syntax elements of the Network Abstraction Layer.

However, the aforementioned rewriting techniques may work only in such cases where the auxiliary picture actually VCL-conforms to version 1 main profile, for example. There is no way to express such a situation in the bitstream.

Figure 2:
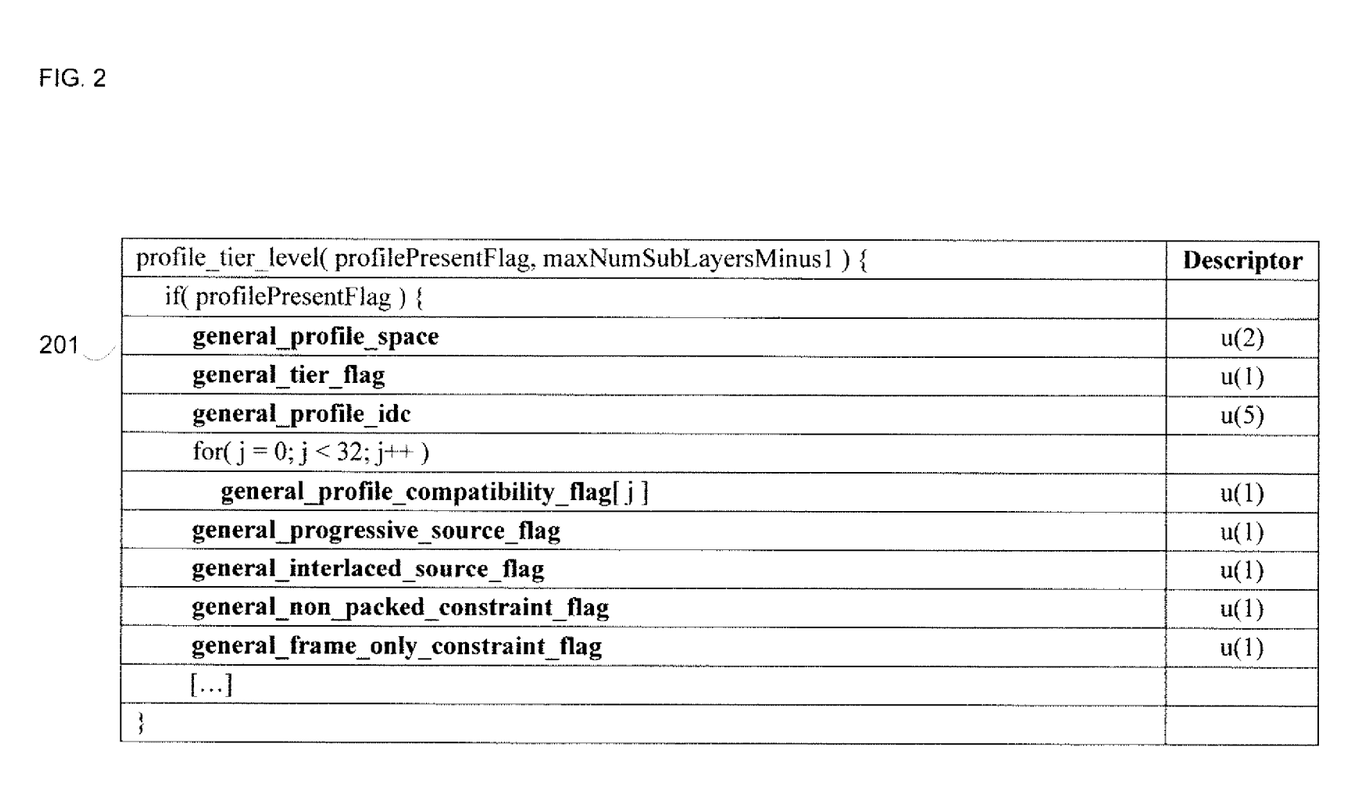
FIG. 2 shows a syntax diagram of the profile_tier_level( ) structure in accordance with an embodiment of the disclosure.

Both HEVC's version 1 video parameter set and sequence parameter set include, in an easily accessible location, compliance information in the form of the profile_tier_level data structure. The start of this data structure if shown in FIG. 2. Attention is drawn to the two bit field general_profile_space (201). This codepoint has originally been introduced to allow "versioning" of profiles. One application is to allow a fresh start of a profile structure in case, during the lifecycle of the standard, the profile structure has developed in an undesirable way due to errors made by the standards setting committee. In version 1, general_profile_space is set to 0. A version 1 decoder should ignore any bitstream with general_profile_space not equal to 0.

In an embodiment, a nonzero value, for example the binary value 01, of the general_profile_space syntax element can be used to indicate that a layer with a non-zero value of nuh_layer_id in a multi-layer bitstream is otherwise conforming to a profile. In other words, one of the four potential permutations of the general_profile_space syntax element creates an escape condition, that essentially tells the decoder that it can ignore the "incorrect" (as defined in version 1) setting of nuh_layer_id during decoding, and otherwise operate as usual.

Alternatively or in addition, an unused codepoint (like a reserved bit) could be used for the signalling.

This modification can enable VCL-conformance signalling of auxiliary pictures, including the case when multiple auxiliary picture layers are present within a bitstream.

The use of the general_profile_space syntax element in the aforementioned form effectively creates an additional "Extension" profile for an existing profile, such that, for example, an Extension Main profile would be defined which allows general_profile_space to be equal to 1, without modifying the existing Main profile. The two differences between the extension profile and the main profile would be, for example a) the value of general_profile_space, and b) allowed values for nuh_layer_id other than zero (and implied changes to the parameter set syntax, for example). The use of nonzero values of general_profile_space can conceivably be extended to other bitstream features and conditions.

Version 1 decoders conforming to Main profile may not be required to decode an Extension Main profile bitstream, as they do not understand nonzero general_profile_space, nor nonzero nuh_layer_id. However, it would be straightforward for future decoder implementations to be expanded to support Extension Main profile, in addition to support for Main profile, and or by rewriting the bitstream in comparatively lightweight operations already described. Similarly, "Extension" profiles could be defined for other profiles, such as Main 10, Stereo Main, Scalable Main, the RExt profiles, and any future profiles, if so desired. These new profiles can become at least VCL-conformant to their respective parent profiles.

For decoders implementing the "Extension" profiles, when general_profile_space equal to a pre-defined non-zero value such as 01, parsing of the SPS and PPS would include some syntax parsing modifications which may occur, for example, when nuh_layer_id of the parameter set NAL unit is greater than 0. Note, however, that the current design already includes a base_layer_parameter_set compatibility_flag[i] in the VPS VUI which may be used to indicate a constraint that the nuh_layer_id value of the SPS and PPS NAL units is equal to 0, in which case the parsing of the SPS and PPS is identical to those in the single layer profiles. Parsing of the VPS and VPS extension (present, for example, in the version 2 extensions such as SHVC. MV-HEVC, or the Rext profiles) would also be required for decoders conforming to the "Extension" profiles.

For bitstreams conforming to the "Extension" profiles corresponding to single layer profiles, i.e. Main, Main 10, constraints can be imposed such that decoding of the slice layer and below would be identical to the associated single layer profile; in other words, they can be VCL-conformant. Accordingly, those low-level decoding function, which can be implemented in hardware or highly optimized software, can remain unchanged. In the layered extensions specifications, profile, tier, and level constraints are in the SHVC working draft defined for output layer sets, rather than for individual layers, as is the case for the single layer HEVC version 1 profiles.

According to an embodiment, to indicate conformance with a single layer "Extension" profile, i.e. Extension Main, an output layer set can contain only a single auxiliary picture layer. With j being the nuh_layer_id value of the auxiliary picture layer, selected by the encoder out of the numbering range available and taking into account already assigned nuh_layer_id values, the value of NumDirectRefLayers[j] can be restricted to be equal to 0 and the value of poc_lsb_not_present_flag[j] can be restricted to be 0 when general_profile_space is equal to 1.

Figure 3:
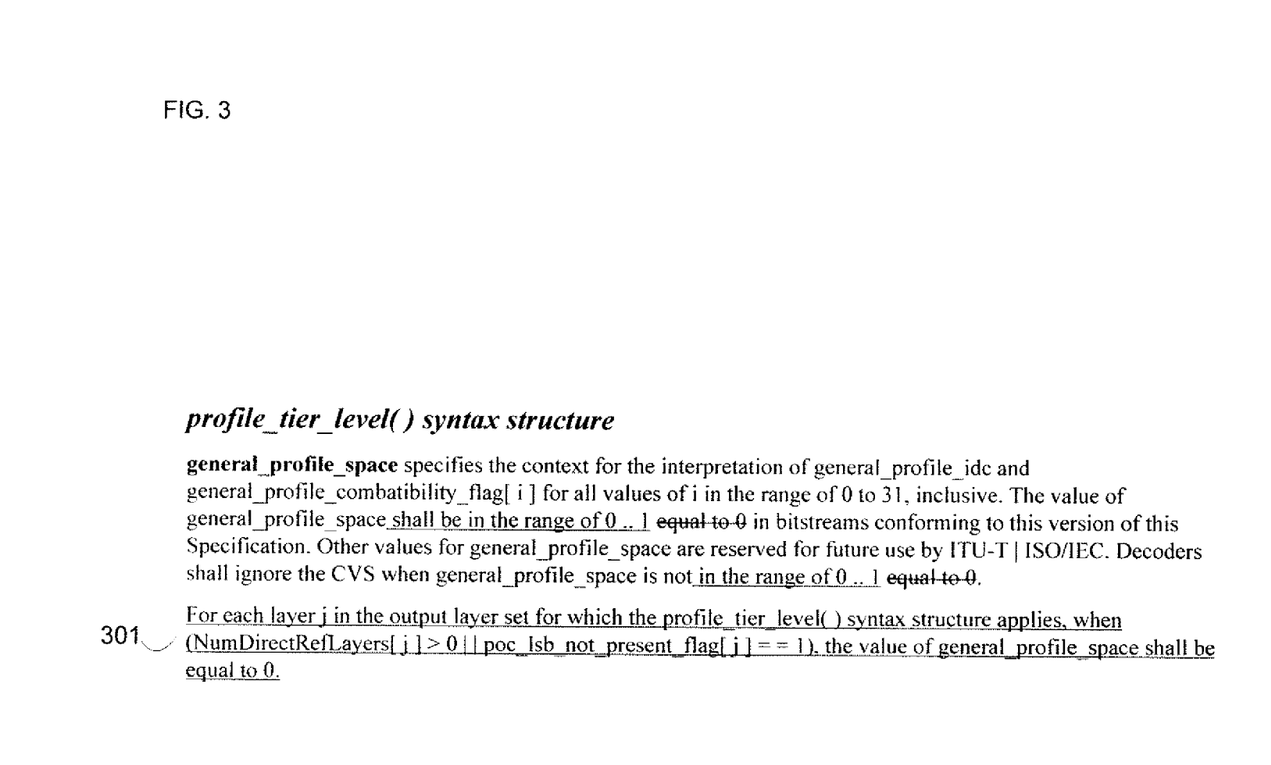
FIG. 3 shows a semantics of the profile_tier_level( ) structure in accordance with an embodiment of the present disclosure.
Figure 4:
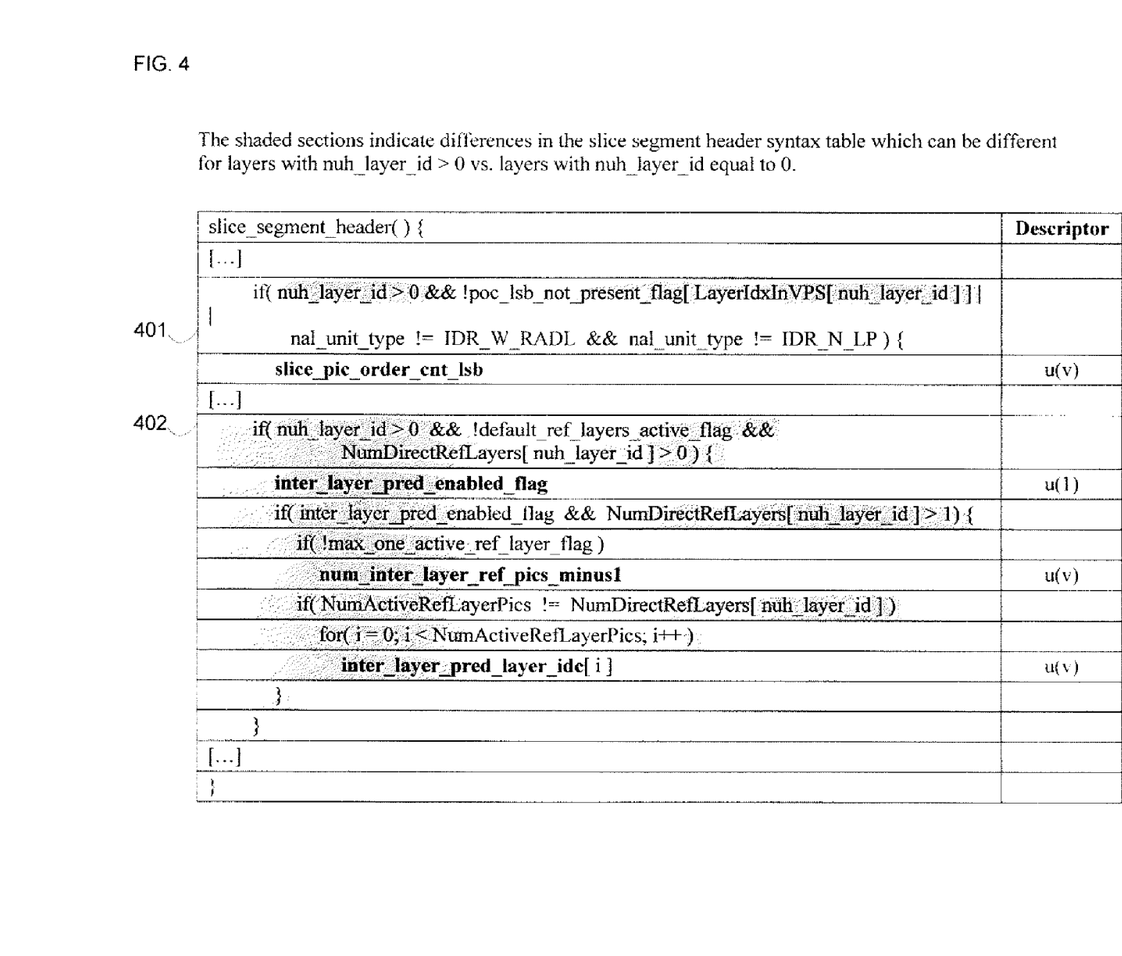
FIG. 4 shows a syntax diagram of a slice segment header in accordance with an embodiment of the disclosure.

Referring to FIG. 3, this restriction can, for example, be expressed as a constraint (301) on the value of general_profile_space for the layers contained in the output layer set to which the profile_tier_level( ) syntax structure applies. Without such a restriction, the slice segment header syntax may differ for layers with nuh_layer_id>0 from those with layers with nuh_layer_id equal to 0. The restriction on NumDirectRefLayers may require that the layer does not use inter-layer prediction from any other layers. Referring to FIG. 4, condition (402), when NumDirectRefLayers is restricted to equal 0, several syntax elements included in the slice segment header for SHVC but not for the HEVC version 1 Main and Main 10 profiles, including inter_layer_pred_enabled_flag, num_inter_layer_ref_pics_minus1, and inter_layer_pred_layer_idc[ ] will not be present. Referring to FIG. 4, aforementioned restriction on poc_lsb_not_present_flag may necessitate the presence in the slice segment header of the slice_pic_order_cnt_lsb, to correspond to HEVC version 1. This is expressed here by condition (401). When these constraints are satisfied, the slice segment header syntax can be backwards compatible with HEVC version 1. Requiring those constraints to be met in a bitstream with a non-zero value of general_profile_space ensures that decoders complying with an "Extension" profile do not require any different processing at the slice layer or below than the corresponding single layer version 1 profile, i.e., an Extension Main profile decoder would have the same syntax, semantics, and decoding process at the slice layer and below as a Main profile decoder.

When multiple auxiliary picture layers are present in the bitstream, more than one output layer set may be defined. For example, consider a bitstream containing two views, and overlay content auxiliary pictures associated with each view. In addition to the output layer sets which contain the primary pictures, a first additional output layer set could contain an overlay content auxiliary picture layer associated with the base view layer with an Extension Main profile indication, and a second additional output layer set could contain both the overlay content auxiliary picture layer associated with the base view layer and the overlay content auxiliary picture associated with an enhancement view layer with an Extension Stereo Main profile indication.

The "Extension" profiles can also be used to indicate conformance for simulcast spatial enhancement layers or view layers. For example, consider a bitstream containing two simulcast spatial layers. The lower resolution base layer could conform to Main profile. An output layer set containing only the higher resolution simulcast enhancement layer could conform to Extension Main profile. If desired, an additional output layer set containing both layers could be described which would conform to Scalable Main profile.

An encoder can make use of the above syntax as follows. Once identified that at least one auxiliary picture is to be used that conforms to a profile such as version 1 main profile except for the different nuh_layer_id (that has to be nonzero to identify the picture as an auxiliary picture), the encoder can prepare sequence and video parameter sets to describe/include, respectively, a description of the profile of the auxiliary picture. That description can be created, for example, by writing a VPS and SPS with in their respective profile_ tier_level( ) structure, general_profile_space set to 1 (instead of 0). From this time onward in the bitstream, the encoder can code nal units of the auxiliary picture with a non-zero nuh_layer_id and referring to the previously created SPS and relevant sections in the VPS. When coding auxiliary pictures, the encoder further has to obey the constraints previously described.

A decoder, upon reception of a VPS including a layer in which the profile_tier_level( ) structure contains a non-zero general_profile_space syntax element, is advised that the bitstream may contain auxiliary pictures in that layer (as indicated by the nuh_layer_id). It is further advised, that the profile for the auxiliary picture corresponds to the profile indicated in the SPS or the relevant section of the VPS describing that layer (at least in terms of VCL-conformance), but may also contain NAL units with a nuh_layer_id other than zero. Upon detection of such a NAL unit, the decoder knows that it is part of an auxiliary picture that but for the nuh_layer_id would correspond to the indicated profile. To decode it, may need to switch state, and then high level functions in the decoder can, if so desired, rewrite the nuh_layer_id to zero (among other operations involving NAL syntax elements such as parameter sets) so to form a compliant bitstream. Then, possibly using optimized software or hardware functionality, the decoder can decode the NAL unit. Thereafter, the decoder may switch state back to the non-auxiliary pictures.

The methods for signaling conformance points using profile space, described above, can be implemented as computer software using computer-readable instructions and physically stored in computer-readable medium. The computer software can be encoded using any suitable computer languages. The software instructions can be executed on various types of computers. For example, FIG. 5 illustrates a computer system 500 suitable for implementing embodiments of the present disclosure.

Figure 5:
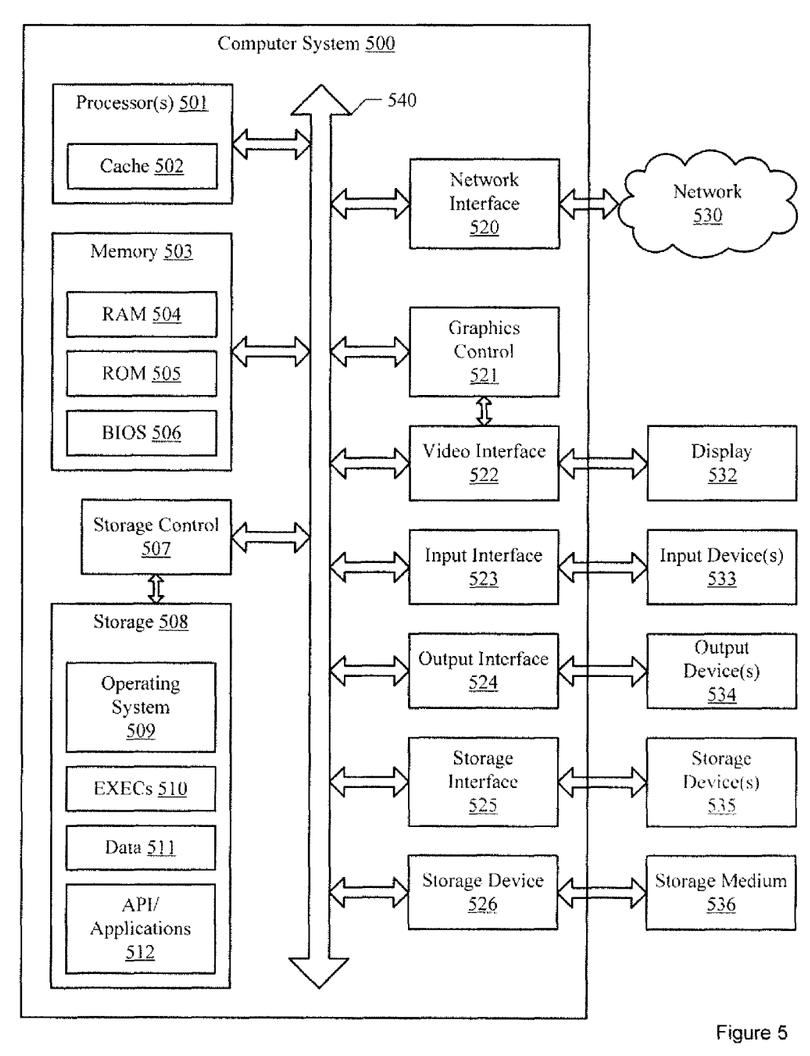
FIG. 5 shows an exemplary computer system in accordance with an embodiment of the present disclosure.

The components shown in FIG. 5 for computer system 500 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 500 can have many physical forms including an integrated circuit, a printed circuit board, a small handheld device (such as a mobile telephone or PDA), a personal computer or a super computer.

Computer system 500 includes a display 532, one or more input devices 533 (e.g., keypad, keyboard, mouse, stylus, etc.), one or more output devices 534 (e.g., speaker), one or more storage devices 535, various types of storage medium 536.

The system bus 540 link a wide variety of subsystems. As understood by those skilled in the art, a "bus" refers to a plurality of digital signal lines serving a common function. The system bus 540 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 501 (also referred to as central processing units, or CPUs) optionally contain a cache memory unit 502 for temporary local storage of instructions, data, or computer addresses. Processor(s) 501 are coupled to storage devices including memory 503. Memory 503 includes random access memory (RAM) 504 and read-only memory (ROM) 505. As is well known in the art, ROM 505 acts to transfer data and instructions uni-directionally to the processor(s) 501, and RAM 504 is used typically to transfer data and instructions in a bi-directional manner. Both of these types of memories can include any suitable of the computer-readable media described below.

A fixed storage 508 is also coupled bi-directionally to the processor(s) 501, optionally via a storage control unit 507. It provides additional data storage capacity and can also include any of the computer-readable media described below. Storage 508 can be used to store operating system 509, EXECs 510, application programs 512, data 511 and the like and is typically a secondary storage medium (such as a hard disk) that is slower than primary storage. It should be appreciated that the information retained within storage 508, can, in appropriate cases, be incorporated in standard fashion as virtual memory in memory 503.

Processor(s) 501 is also coupled to a variety of interfaces such as graphics control 521, video interface 522, input interface 523, output interface 524, storage interface 525, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 501 can be coupled to another computer or telecommunications network 530 using network interface 520. With such a network interface 520, it is contemplated that the CPU 501 might receive information from the network 530, or might output information to the network in the course of performing the above-described method. Furthermore, method embodiments of the present disclosure can execute solely upon CPU 501 or can execute over a network 530 such as the Internet in conjunction with a remote CPU 501 that shares a portion of the processing.

According to various embodiments, when in a network environment, i.e., when computer system 500 is connected to network 530, computer system 500 can communicate with other devices that are also connected to network 530. Communications can be sent to and from computer system 500 via network interface 520. For example, incoming communications, such as a request or a response from another device, in the form of one or more packets, can be received from network 530 at network interface 520 and stored in selected sections in memory 503 for processing. Outgoing communications, such as a request or a response to another device, again in the form of one or more packets, can also be stored in selected sections in memory 503 and sent out to network 530 at network interface 520. Processor(s) 501 can access these communication packets stored in memory 503 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 500 can provide functionality as a result of processor(s) 501 executing software embodied in one or more tangible, computer-readable media, such as memory 503. The software implementing various embodiments of the present disclosure can be stored in memory 503 and executed by processor(s) 501. A computer-readable medium can include one or more memory devices, according to particular needs. Memory 503 can read the software from one or more other computer-readable media, such as mass storage device(s) 535 or from one or more other sources via communication interface. The software can cause processor(s) 501 to execute particular processes or particular parts of particular processes described herein, including defining data structures stored in memory 503 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for indicating Video-Coding-Layer (VCL-) conformance of a second coded enhancement picture layer comprising at least one coded auxiliary picture of a coded video bitstream with an HEVC version 1 decoder in a decoder, the method comprising:
receiving and decoding a video parameter set comprising at least two entries, each entry comprising a profile-tier-level structure,
the first entry pertaining to a primary coded picture layer having a first layer_id equal to zero, a first field general_profile_space equal to zero, and a first combination of profile, tier, and level,
the second entry pertaining to the second coded enhancement picture layer having a second layer_id not equal to 0, a second field general_profile_space, and a second combination of profile, tier, and level, and
indicating VCL-conformance with an HEVC version 1 decoder if the second field general_profile_space of the second entry is non-zero, the first field general_profile_space is zero, and the HEVC version 1 decoder is capable of decoding a bitstream compliant with the second entry with the second field general_profile_space of the second entry assumed to be equal to 0,
wherein the second coded enhancement picture layer is not a temporal enhancement layer of the primary coded picture layer.

2. The method of claim 1, further comprising:
decoding by a VCL portion of the decoder at least one slice of the picture of the second layer, wherein the decoder is VCL-compliant with HEVC version 1.

3. A non-transitory computer readable medium comprising a set of executable instructions to direct a processor to perform the method in claim 2.

4. The method of claim 1, wherein at least one picture of the second picture layer is a simulcast picture.

5. A non-transitory computer readable medium comprising a set of executable instructions to direct a processor to perform the method in claim 4.

6. The method of claim 1, wherein a VCL conformant bitstream to a profile A comprises syntax elements of the slice header and all syntax elements included in a coded slice, all of which conform to profile A.

7. A non-transitory computer readable medium comprising a set of executable instructions to direct a processor to perform the method in claim 6.

8. The method of claim 1, wherein a VCL conformant bitstream to profile A further comprises at least one syntax element of a Network Abstraction Layer not conforming to profile A, wherein the all syntax elements of the Network Abstraction Layer are not part of the VCL.

9. A non-transitory computer readable medium comprising a set of executable instructions to direct a processor to perform the method in claim 8.

10. A non-transitory computer readable medium comprising a set of executable instructions to direct a processor to perform the method in claim 1.

11. A system for indicating Video-Coding-Layer (VCL-) conformance of a second coded enhancement picture layer comprising at least one coded auxiliary picture of a coded video bitstream with an HEVC version 1 decoder in a decoder, the system comprising:
a decoder (including a combination of hardware and software) configured to:
receive and decode a video parameter set comprising at least two entries, each entry comprising a profile-tier-level structure,
the first entry pertaining to a primary coded picture layer having a first layer_id equal to zero, a first field general_profile_space equal to zero, and a first combination of profile, tier, and level,
the second entry pertaining to the second coded enhancement picture layer having a second layer_id not equal to 0, a second field general_profile_space, and a second combination of profile, tier, and level, and
indicate VCL-conformance with an HEVC version 1 decoder if the second field general_profile_space of the second entry is non-zero, the first field general_profile_space is zero, and the HEVC version 1 decoder is capable of decoding a bitstream compliant with the second entry with the second field general_profile_space of the second entry assumed to be equal to 0, wherein the second coded enhancement picture layer is not a temporal enhancement layer of the primary coded picture layer.

12. The system of claim 11, wherein the decoder is further configured to: decode by a VCL portion of the decoder at least one slice of the picture of the second layer, wherein the decoder is VCL-compliant with HEVC version 1.

13. The system of claim 11, wherein at least one picture of the second picture layer is a simulcast picture.

14. The system of claim 11, wherein a VCL conformant bitstream to a profile A comprises syntax elements of the slice header and all syntax elements included in a coded slice, all of which conform to profile A.

15. The system of claim 11, wherein a VCL conformant bitstream to profile A further comprises at least one syntax element of a Network Abstraction Layer not conforming to profile A, wherein the all syntax elements of the Network Abstraction Layer are not part of the VCL.

* * * * *